US009448987B2

(12) United States Patent
Rajkumar (10) Patent No.: US 9,448,987 B2
(45) Date of Patent: Sep. 20, 2016

(54) INSERTING RULES-DRIVEN PARAGRAPHS INTO USER-DESIGNATED LOCATIONS IN A DOCUMENT IRRESPECTIVE OF MODIFICATIONS TO THE STRUCTURE OF THE DOCUMENT

(75) Inventor: Vijayanand Rajkumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 540 days.

(21) Appl. No.: 13/596,740

(22) Filed: Aug. 28, 2012

(65) Prior Publication Data

US 2014/0068422 A1  Mar. 6, 2014

(51) Int. Cl.
*G06F 17/27* (2006.01)
*G06F 17/24* (2006.01)

(52) U.S. Cl.
CPC ............ *G06F 17/248* (2013.01); *G06F 17/27* (2013.01)

(58) Field of Classification Search
CPC .................. G06F 17/27; G06F 17/25
USPC ......................................... 715/243
See application file for complete search history.

(56) References Cited

U.S. PATENT DOCUMENTS

| 7,844,422 B2 * | 11/2010 | Fritz et al. ................ 703/2 |
| 2004/0205656 A1 * | 10/2004 | Reulein et al. ............ 715/530 |
| 2006/0080599 A1 * | 4/2006 | Dubinsky ............. G06F 17/248 |
| | | 715/255 |
| 2006/0287966 A1 | 12/2006 | Srinivasaraghavan et al. |

\* cited by examiner

*Primary Examiner* — Kavita Padmanabhan
*Assistant Examiner* — Tionna Burke
(74) *Attorney, Agent, or Firm* — Vista IP Law Group, LLP; Peter Mei (57) ABSTRACT

A computer implemented method commences by receiving document construction rules, then selecting a document template from a template library. The document template comprises a plurality of paragraphs that are associated with document construction rules. The method evaluates the construction rules and applies visibility to any of the associated paragraphs. Low latency processing of the visibility is accomplished in part by forming a document graph formed of conditional nodes, where the nodes have a paragraph label and a respective visibility flag. Further, a mapping datastructure serves to map from a paragraph label to a location of the corresponding conditional node within the document graph. A processor evaluates the document construction rules and, using the mapping datastructure, determines the location of the conditional node in order to modify the value of the visibility flag. In some cases, the document graph is a tree structure, and the mapping datastructure is a hash table.

20 Claims, 7 Drawing Sheets

| File | Edit | View | Go | Help |

Questions

Search ______________

Name: [______]   Intent: [______▶]

Decsription: [______]   Value Set: [______]

⎵ 502

[ Create A Question ] — 504₁

| Name | Question Prompt | Description | Enabled | Intent | Update | Delete |
|---|---|---|---|---|---|---|
| Women Owned Business | Is this a Women Owned Business? | Question is to ascertain whether contract is solicited from a women owned business | | Buy | | |
| Minority Owned Business | Is this a Minority Owned Business? | Question is to ascertain whether contract is solicited from a minority owned business | ☑ | Buy | | |

[ Create A Question ] — 504₂

Contract Terms Library    Contracts Setup    Sign Out    Help

INSERTING RULES-DRIVEN PARAGRAPHS INTO USER-DESIGNATED LOCATIONS IN A DOCUMENT IRRESPECTIVE OF MODIFICATIONS TO THE STRUCTURE OF THE DOCUMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of electronic publishing of contracts and other documents and more particularly to techniques for inserting rules-driven paragraphs into user-designated locations in a document after structural revisions.

BACKGROUND

Some embodiments of the present disclosure are directed to an improved approach for implementing inserting rules-driven paragraphs into user-designated locations in a document after structural revisions.

Electronic documents can be composed using electronic publishing tools that support rules-driven assembly to conditionally bring in document components (e.g., paragraphs, clauses, etc.) that need to be inserted into the document based on the evaluation of applicable rules. Legacy solutions can place such conditional content at specific spots in the document (e.g., using a paragraph numbering scheme), however legacy solutions are deficient in that certain types of conditional placements do not survive review cycles. For example, the paragraph numbering scheme can break down if a paragraph is moved during the course of a review cycle. Legacy template-based solutions (e.g., using anchor points) are also deficient due to the likelihood that a document based on a template may be modified/re-arranged, with clauses and/or entire sections deleted (along with the anchor points) before the conditional insertion process is commenced. Indeed, some legacy approaches attach conditional components to existing content in the template using anchors (e.g., placing an anchor before or after a particular paragraph in the template), however if the existing content to which the anchor is attached is deleted, the conditional components become unanchored or lost, and the original user-designated location can be lost as well.

A solution is needed to insert rules-driven paragraphs or clauses at user-designated locations irrespective of modifications made to documents during revision cycles. Additionally, the solution should be scalable so as to be applicable to even very large documents. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for inserting rules-driven paragraphs into user-designated locations in a document after structural revisions.

A computer implemented method commences by receiving document construction rules, and selecting a document template from a template library. The document template comprises a plurality of paragraphs that are associated with document construction rules. The method evaluates the construction rules and applies a "visibility" to any of the associated paragraphs. Low latency running time for this processing is accomplished in part by forming a document graph formed of conditional nodes, where the nodes have a paragraph label and a respective visibility flag. Further, a mapping datastructure serves to map directly from a paragraph label to a location of the corresponding conditional node within the document graph.

The nodes within the document graph (and/or the paragraphs of an instance of the document template) can be moved around during revisions, yet the method evaluates the construction rules and applies visibility to any of the associated paragraphs. In some cases, the document graph is a tree structure, and the mapping datastructure is a hash table.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing inserting rules-driven paragraphs into user-designated locations in a document after structural revisions. More particularly, disclosed herein are environments, methods, and systems for implementing inserting rules-driven paragraphs into user-designated locations in a document after structural revisions.

Overview

Described herein-below and in the accompanying figures are scalable methods and apparatus to insert rules-driven language into a business document at the appropriate user-designated locations, irrespective of modifications to the original document template (e.g., during composition and authoring cycles):

The techniques herein do not rely on document numbering schemes to determine locations to insert and/or establish visibility of rules driven paragraphs.

The techniques herein do not rely on a relative position from specially-marked "anchor" paragraphs to determine a new insertion location, or to determine the location of a particular paragraph subject to one or more of the rules.

Furthermore, the disclosure herein is applicable to any business document (e.g., proposals/bids, RFQs, customer/supplier correspondence/letters, online/web content, etc.) that can be composed by rules-driven engines.

DEFINITIONS

The term "logic" means any combination of software or hardware that is used to implement all or part of the embodiments of the present disclosure.

A "module" includes any mix of any portions of computer memory and any extent of logic and/or other circuitry including circuitry embodied as a processor.

Reference is now made in detail to certain embodiments. The disclosed embodiments are not intended to be limiting of the claims.

DESCRIPTIONS OF EXEMPLARY EMBODIMENTS

Figure 1:
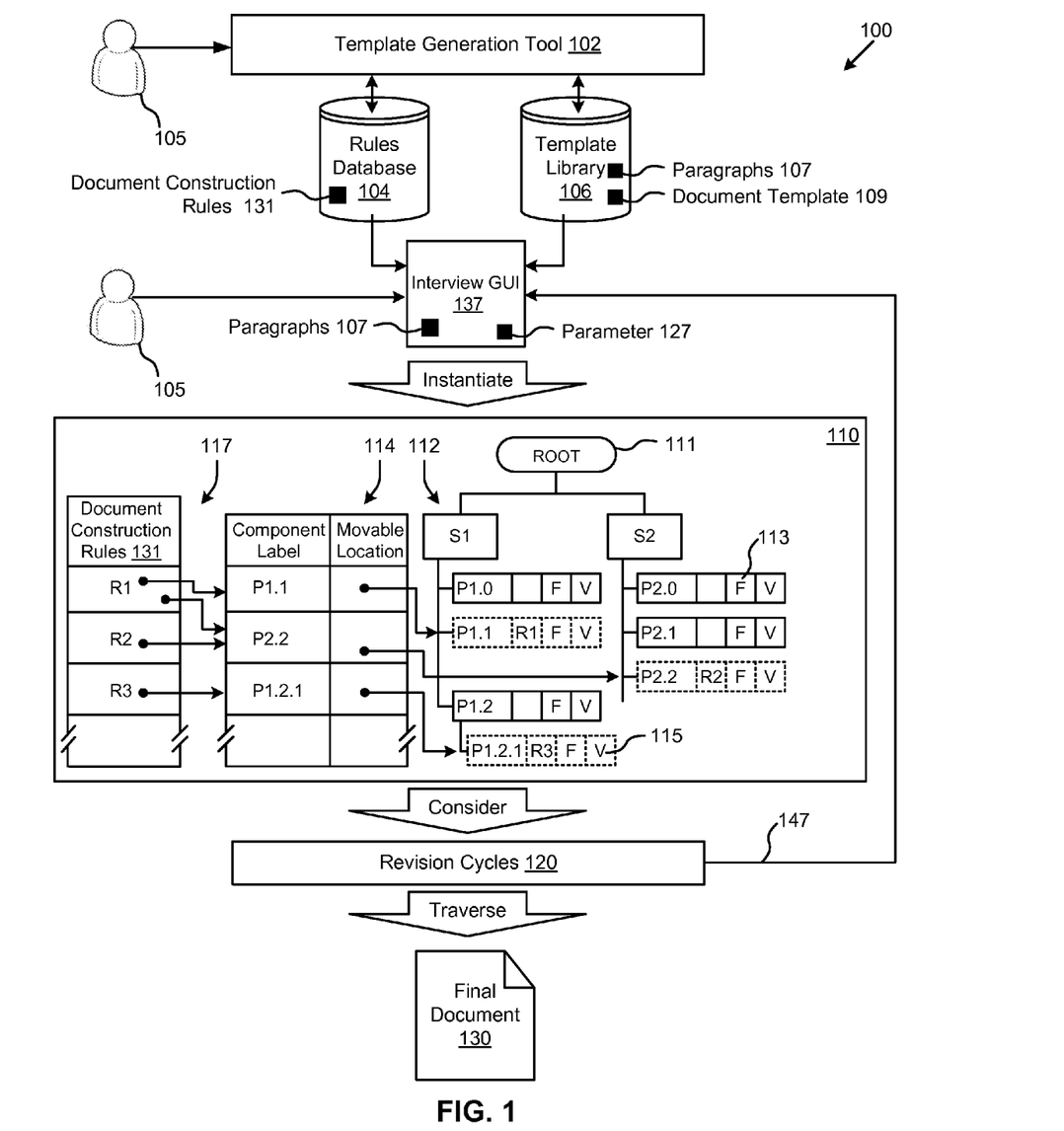
FIG. 1 is a depiction of a flow within a system for inserting rules-driven paragraphs into user-designated locations in a document after structural revisions, according to some embodiments.

FIG. 1 is a depiction of a flow within a system 100 for inserting rules-driven paragraphs into user-designated locations in a document after structural revisions. As an option, the present system 100 may be implemented in the context of the architecture and functionality of the embodiments described herein. Also, the system 100 or any aspect therein may be implemented in any desired environment.

As shown, the flow within system 100 commences upon an event of a user 105 operation of a template generation tool 102 to load-in or otherwise store a template document into a template library. For example, user operation of the aforementioned template generation tool includes reading and writing individual rules to/from the rules database 104 as well as reading and writing document template representations to/from the template library 106. A document template 109 as used herein and as is embodied in the template library 106 comprises a reading flow organized into one or more containers (e.g., sections, possibly hierarchical sections) which in turn comprise components (e.g., paragraphs 107). Some or all of the paragraphs 107 are associated with any number of document construction rules 131. A document construction rule can be evaluated by a computer, and if the rule "fires" (e.g., is true) the herein-disclosed system will include the paragraph in the final document 130. Document construction rules are evaluated prior to outputting a final document. As shown, a selected template retrieved from the template library can be an input to an interview process, interview GUI 137). The results of user interaction with the interview process and the selected template are combined and formed into a document graph with sections and paragraphs represented as nodes. The nodes of the document graph may be organized hierarchically. Some of the nodes in the graph represent conditional paragraphs.

More particularly, paragraphs of a document template can be stored as a computer usable document (e.g., in a native word processing format), and can be formed into a document graph (e.g., a tree, a list). Such a graph comprises nodes in the graph that take on document construction attributes. For example, a node can be designated to be a container (e.g., a section, etc.) or a component (e.g., a paragraph or a clause, etc.). Some of the components (e.g. a paragraph, a clause etc.) specified in the template can be designated as conditional. Conditional components found in the template are associated to rules that determine if a respective component is to be visible or not in a document generated from the template. Note that by specifying conditional components during template definition processing, users can specify the locations in the document where the components should appear when the template is instantiated if the applicable rule or rules evaluate to true during document generation (e.g., for example when generating an instance of a final document).

An exemplary visual depiction of one embodiment of a document template graph is shown as document template tree 112, which forms from root node 111. Forming a document graph can be achieved using any known-in-the-art techniques, including generating a structure in a computer memory, or generating a text representation of the graph, such as by using XML. Strictly as an example, an XML tag offers one possible syntax for a node. For example:

<Node Label="P1.1",Visibility="invisible",Rule="R1"/Node> (1)

Individual rules as are populated into the rules database 104 characterize conditions that can be evaluated before, during and after document construction. A rule can specify conditions with respect to user-specified parameters (e.g., variables or events). For example a rule might fire (e.g., evaluate to "TRUE") if a condition is true, or if a variable or parameter 127 holds a particular value or range. Or, for example, a rule might evaluate to "TRUE" if a particular event had occurred. An XML tag offers one possible syntax for a rule. For example:

<Rule1 Label="R1",Jcode="(var1=1 ? TRUE: FALSE)"/Rule1> (2)

The XML tag (1) specifies a label (e.g., "Label") that can be used to facilitate human readability, and the XML tag (2) specifies a computer code "if then else" expression that can be evaluated by a computer.

Now, by combining entries in the rules database with entries in the template library, a user 105 can use an interview GUI 137 to answer questions, the answers to which questions are used to evaluate rules and determine the visibility of conditional components. When the interview process is deemed complete, a document template tree can be constructed, which document template tree comprises nodes representing components (esp., at least some conditional components). As shown in the document template tree 112, a container (e.g., section="S1" and section="S2") comprise components (e.g., "P1.0", "P1.1", "2.0", etc.), some of which components can be conditional components (e.g., "P1.1", "P1.2.1", etc.). The specific instance of document template tree 112 as shown comprises conditional nodes (e.g., "P1.1", "P1.2.1", and "P2.2") as shown and highlighted with a broken-line border. Further, any conditional component can comprise a rule identifier (e.g., a rule name, or a rule label, etc.) to refer to a rule from the rules database, and can comprise additional fields (e.g., the "F" field 113) for holding forward references to paragraphs that are stored as a computer usable document (e.g., in a native word processing format).

A container or component can be abstracted to be referred to by a handle. For example, a paragraph can be referred to by a handle or component label. As shown, a mapping datastructure 114 can be constructed to comprise a list of entries having component references (e.g., see the column component label) with its respective location (e.g., memory pointer) to a location in the document template tree 112. The location can be a memory reference, or a label, or a hash value, or can employ any technique to refer to the location of a component or container within the document template tree 112.

Forming a mapping structure can be achieved using any known-in-the-art techniques, including generating a data structure in a computer memory, such as a hash table, or generating a text representation, such as by using XML. A rule identifier (e.g., a rule name, or a rule label, etc.) referring to a rule from the rules database can be applied to any number of components. Shown are document construction rules 131 in a set of rule-to-paragraph entries 117, which serve to relate a particular document construction rule to one or more components. As shown, document construction rule R1 applies to two paragraphs, namely the paragraph with component label "P1.1" and the paragraph with component label "P2.2". Also, the shown document construction rules R2 and R3 each applies to a single respective paragraph, namely the paragraphs with component labels ("P2.2" and "P1.2.1".

Now, having the organization 110 comprising a set of rule-to-paragraph entries 117, a mapping datastructure 114, and document template tree 112, the flow of system 100 proceeds to operations for document construction and revision cycles 120, and such operations include generating an instance of a subject document (e.g., generated from a document template) which in turn serves to facilitate revisions and/or modifications (e.g., without modifying the document template itself). Revisions and/or modifications may be facilitated by returning (e.g., over path 147) to the interview process, the act of which can comprise modifying the contents of the set of rules, and/or changing conditions, or parameters, or recording the status such as the occurrence or absence of occurrence of an event.

As can be understood by those skilled in the art, the aforementioned techniques serve to insert rules-driven clauses or paragraphs (e.g., conditional components) into user-designated locations in the final document irrespective of modifications to the structure of the subject document. Exemplary embodiments use the template generation tool 102 for defining the document template so as to allow the user to include/specify conditional (e.g., rules-driven) components in the user-specified locations, which user-specified locations specify where the conditional components are to be included if the condition or conditions or rule or rules evaluate to be "TRUE". The organization 110 and its constituents are defined so as to facilitate marking them as conditionally included. In the embodiment shown, a node can comprise a conditional relationship (e.g., see P1.1 and reference to rule R1) or can be void of a conditional relationship (e.g., see P1.0 and absence of rule reference in the rule field). Furthermore, a node can comprise a visibility indication. For example, the conditional node having component label "P1.2.1" can include a visibility flag 115.

When revisions and/or modification are deemed complete, then a process serves for traversing the document graph to output an instance of a final document 130. While traversing the document graph the process outputs a paragraph when its visibility flag is set to "visible" (and does not output a paragraph when the visibility flag is set to "hidden").

Figure 2:
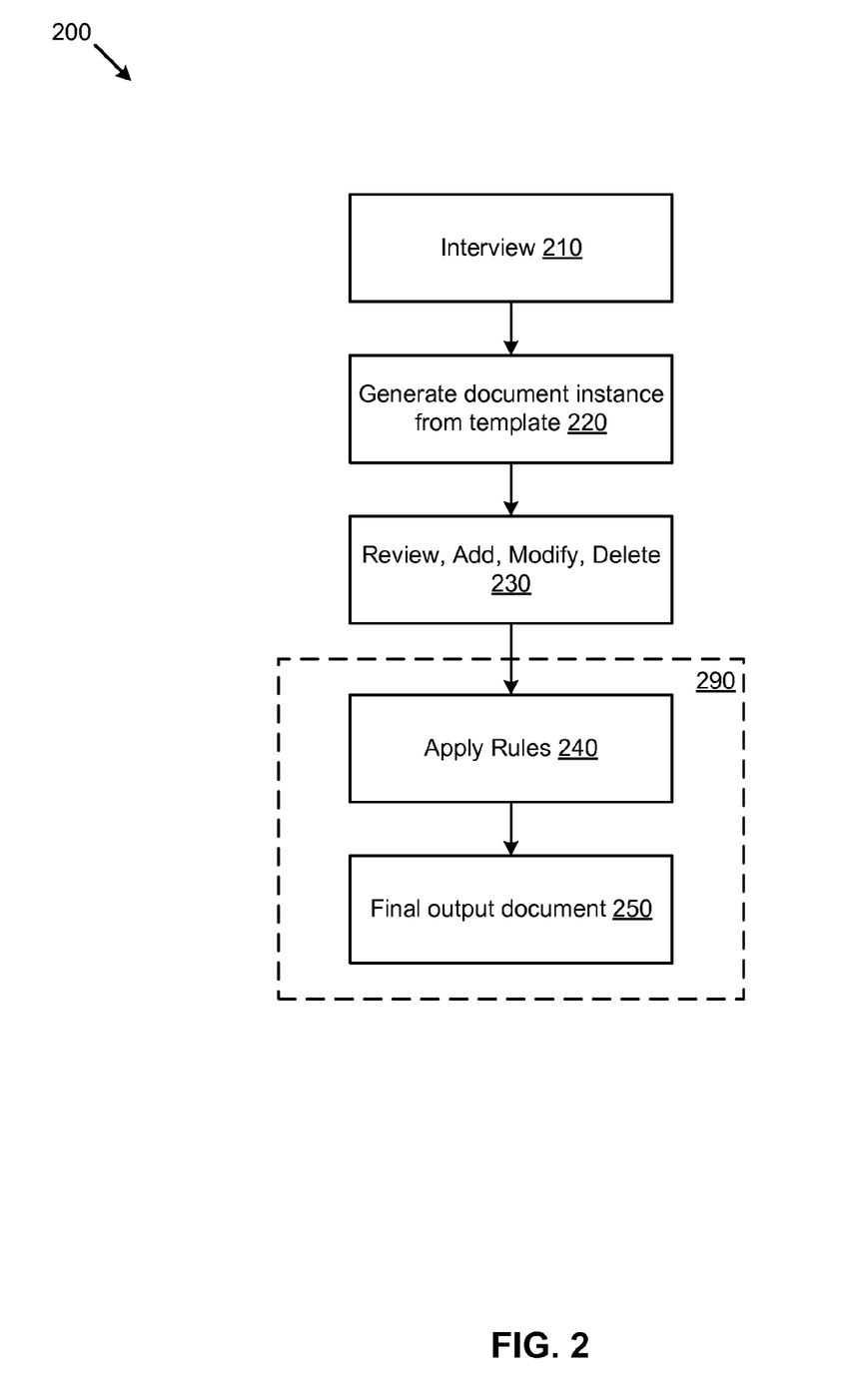
FIG. 2 depicts a construction and modification technique for inserting rules-driven paragraphs into user-designated locations in a document after structural revisions, according to some embodiments.

FIG. 2 depicts a construction and modification technique 200 for inserting rules-driven paragraphs into user-designated locations in a document after structural revisions. As an option, the present modification technique 200 may be implemented in the context of the architecture and functionality of the embodiments described herein. Also, the modification technique 200 or any aspect therein may be implemented in any desired environment.

As shown, the modification technique 200 commences with an interview process (see operation 210), which interview process facilitates identification and selection of a particular document template from a template library 106, and facilitates preparation of an instance of a subject document from the selected document template. In some cases the interview process uses an expert system (see FIG. 4) and any number of user interfaces (see FIG. 5) to facilitate concluding the interview so the technique can proceed to generate a subject document instance from the selected template (see operation 220). When the process to generate a subject document instance from the selected template completes, the subject document may be restructured and/or otherwise modified (see operation 230). Once any subject document restructuring is complete, whether or not any restructuring or modifications were in fact implemented, the subject document can be delivered to a process (see operation 290) to apply the rules (see operation 240), which application of rules serves to both evaluate the rules and then take actions based on the value or conditions of the evaluated rules. When the rules have been applied, a final document is output (see operation 250). In some cases the operation 290 may apply all rules before outputting any portion of the final document. In other cases some portion of the final document is output before all of the applicable rules have been evaluated. In the former case, it is possible to apply all of the rules and take actions based on the conditions of the rules by annotating the document graph of the subject document (e.g., an instance of a document template tree 112). Such a technique can include traversal and annotation of a document tree to apply all applicable rules before outputting any portion of the final document. Such a flow is briefly discussed below.

Figure 3:
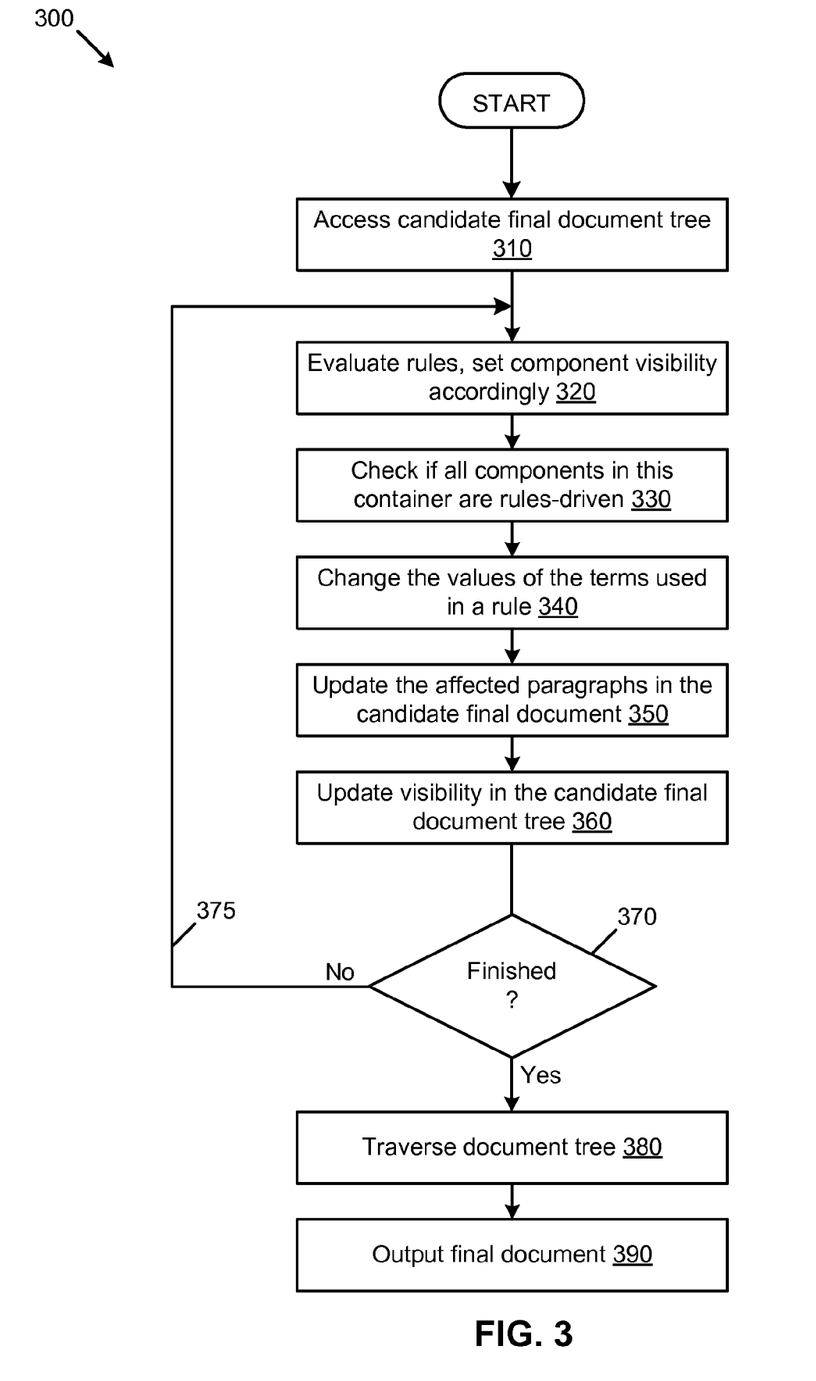
FIG. 3 depicts a flow for traversal and annotation of a document tree used in a system for inserting rules-driven paragraphs into user-designated locations in a document after structural revisions, according to some embodiments.

FIG. 3 depicts a flow for traversal and annotation of a document tree used in a system 300 for inserting rules-driven paragraphs into user-designated locations in a document after structural revisions. As an option, the present system 300 may be implemented in the context of the architecture and functionality of the embodiments described herein. Also, the system 300 or any aspect therein may be implemented in any desired environment.

The system 300 commences by accessing a candidate final document tree (see operation 310). This candidate final document tree initially came into existence when a user instantiated a tree structure in the form of organization 110. Again referring to FIG. 1, the form of organization 110 includes the rules-driven components at the appropriate locations, which were initially annotated as having Visibility="invisible" as shown in XML tag (1) so they are not output in generated versions of the subject document. Moreover, the process to generate a subject document instance from the selected template (see operation 220) can call or include any processes to create a hash table or other form of mapping datastructure 114 comprising a collection of all of the rules-driven components used in the selected template together with the component label, name, or ID. Such a component label, name, or ID can be used as a key to access the mapping datastructure 114.

Continuing the embodiment of a hash table, the value accessed using the key of the hash table entries can include a reference to at least one corresponding tree node that in turn represents an instance of a conditional component. In such an embodiment, the tree structure can be compact inasmuch as it need not contain the actual text of the components; rather any other data representation of the actual text of the components can be stored in any convenient manner. One aspect of use of a hash table is that it provides a constant time lookup of a particular value (e.g., by key) from among an arbitrarily large set of entries.

Once the organization 110 comprising at least a mapping datastructure 114 and document template tree 112 is available, the shown flow proceeds to any activities to review and/or add, and/or delete, and/or otherwise modify the subject document. In some exemplary cases the document undergoes revisions with the aid of an expert system (see FIG. 4). Or, in other cases the document undergoes revisions using other techniques.

Returning to the discussion of FIG. 3, when the revision cycles are deemed complete, a corresponding candidate final document tree can be accessed (see operation 310) and further processing can be invoked to apply the rules and then output the final document. For example such further processing can serve to evaluate the rules (see operation 320) and if a rule evaluates to TRUE (e.g., to indicate a component is to be included) then a lookup (e.g., from a hash table) retrieves the location (e.g., an object reference, a Java object memory address, etc.) of the corresponding component (e.g., paragraph or clause) in the candidate final document tree, and follows the reference to the component so as to set the "Visibility" attribute to make the component visible. The visibility indicator (e.g., visibility flag 115) can be embodied as an attribute that can take on Boolean values or, a visibility indicator can take on any value that establishes the sense of "visible" or "show" and any different value can be used to establish the sense of "hidden" or "invisible". For documents that include paragraph numbering, additional processing can re-number impacted portions of the document to reflect the occurrence of the now visible component. Note that this technique can be applied even if the document had been modified, and/or the formerly invisible nodes and/or their peers and/or containers had been moved around or deleted.

In some cases the application of operation 320 can result in a container where the only remaining components of the container are rules-driven components. In such a case, execution of operation 330 will detect if all remaining components of the container are hidden, and application of operation 330 will mark the parent container as hidden (e.g., visible=FALSE). On the other hand, if any components of the container are visible (e.g., visible=TRUE) then operation 330 will mark the container as visible. Operation 330 will repeat such check/mark operations recursively until reaching the document's root node 111.

In some embodiments, if the first component of a container happens to be the first visible component in the container, then an operation will mark the parent container visible, and will repeat recursively until reaching the document's root node 111. For documents that include paragraph numbering, re-numbering impacted portions of the document will be performed.

As can now be appreciated, even when the user or agent moves an entire container around in the document, any rules-driven components under the container are also moved with the container, even if the visibility is set to hidden or invisible.

It is possible that even after the revision cycles are deemed complete, and all intra-document variables or events are settled and considered, an extra-document variable or event can alter the sense of a rule. For example, a condition might change, or a change in a variable or event (see operation 340) can make a rules-driven component that is currently marked visible to be made invisible, for example because the rule or rules now evaluate to be FALSE (see operation 350). After evaluating any changed conditions, or changed variables or events that are known to have changed, then update a candidate final document tree (see operation 360).

The aforementioned are not the only possibilities for modifying the visibility of a rules-driven component. For example, when modifying a document during authoring or revision cycles, or when using an expert system or other computer-aided module, the user could also be provided the option to show (e.g., opposite sense of hidden) all rules driven components so as to facilitate the human activities of document authoring and making revisions.

As mentioned supra, the technique of system 300 can include traversal and annotation of a document tree to apply all applicable rules before outputting any portion of the final document. This is shown as a decision and loop to determine if all rules have been processed (see decision 370). If not, the loop 375 is taken to evaluate next rules. If so, the processing proceeds to operations to traverse the document tree (see operation 380) and an operation to output the final document (see operation 390).

Figure 4:
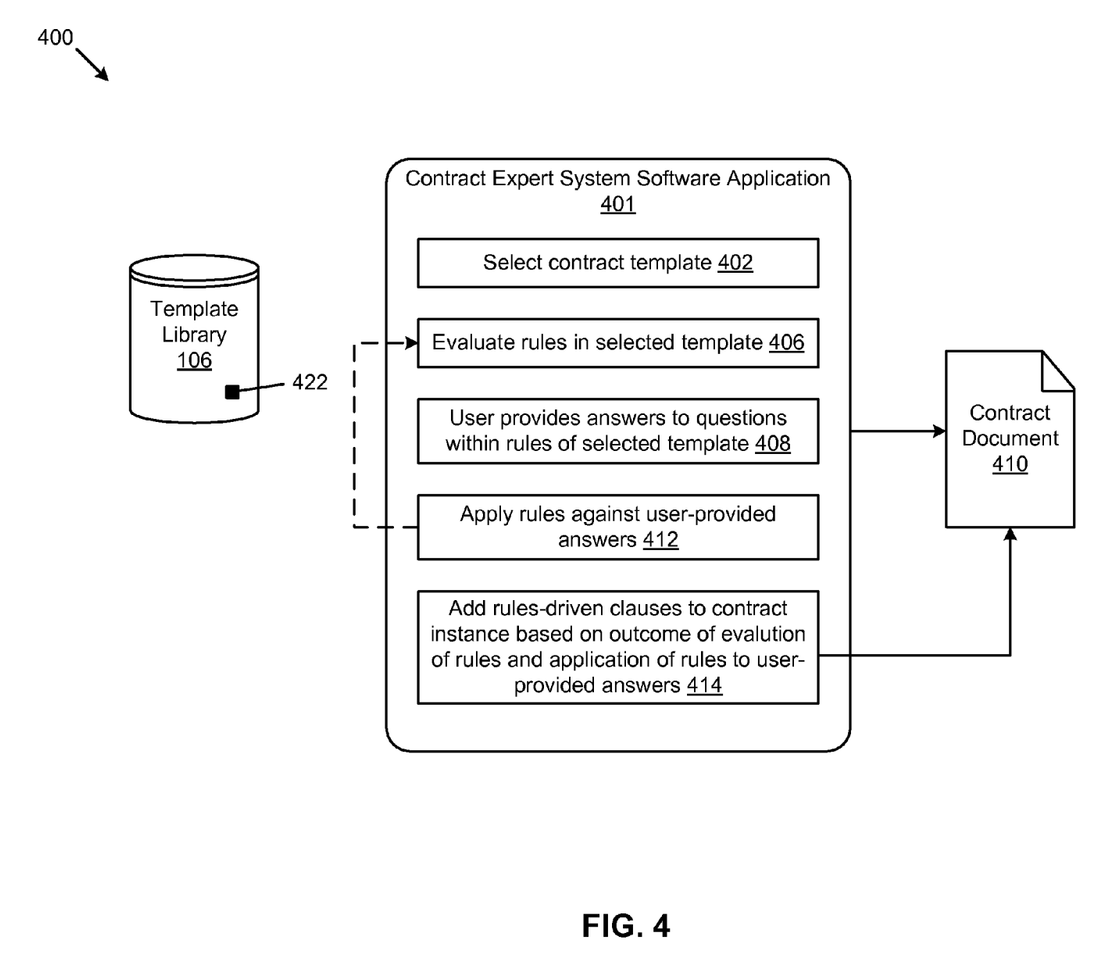
FIG. 4 is a data flow diagram for creating a customized contract within a system for inserting rules-driven paragraphs into user-designated locations in a document after structural revisions, according to some embodiments.

FIG. 4 is a data flow diagram 400 for creating a customized contract within a system for inserting rules-driven paragraphs into user-designated locations in a document after structural revisions. As an option, the present data flow diagram 400 may be implemented in the context of the architecture and functionality of the embodiments described herein. Also, the data flow diagram 400 or any aspect therein may be implemented in any desired environment.

According to one embodiment of the present disclosure, the environment includes a contract expert system software application 401 that provides an automated, rules-based approach for including certain terms and conditions within a contract document. Recognizing that the business and legal landscapes change often, embodiments of the present disclosure enable users to define new rules and to specify the allowable manually input answers to the user-defined questions together with the visibility of a corresponding component. The answers to such user-defined questions may, in turn, be used by one or more rules to determine which clauses are to be selected for inclusion in a customized contract (e.g., via a contract include-exclude parameter). The present contract expert system software application 401, therefore, enables users to set up logical clause selection rules that can be used to generate an instance of a contract from a template. The evaluation of the user-defined rules and the application of user input in response to questions posed by such user-defined rules dictate which clauses are to be included in the contract being generated. These clause selection rules may be used to model government regulations, and/or any other business-related or other regulations or boilerplates or standards. For example, the rules may be used to include specific contract text if certain products are sold (such as hazardous materials, strictly as an example).

Embodiments of the present disclosure implement computer-aided techniques to ensure that contract content follows standardized practices. Embodiments of the present disclosure enable even non-expert users to draft relatively complex customized contracts accurately, thereby reducing both errors and corporate exposure to risk. Yet, as heretofore indicated, a generated contract can be further reviewed (e.g., by an attorney) and still the herein-disclosed techniques can be applied for inserting rules-driven paragraphs into user-designated locations.

As shown in FIG. 4, to create a contract, the user selects a contract template 422 that is appropriate to the contract the user wishes to create (see operation 402). As earlier discussed, a plurality of document templates (e.g. a plurality of contract templates 422) can stored in a template library 106. In the specific case where document template is embodied as a contract template, then a contract template 422 may include components (e.g., contract clauses appropriate for the type of contract template selected). One or more of the rules contained within each contract template 422 may include one or more user-defined questions that require user input. The user-provided answers to the user-defined questions are evaluated against one or more user-defined rules, and the evaluation of the rules (see operation 406) drives the selection and incorporation of additional clauses into the contract document 410 being created. As shown in FIG. 4, a contract expert system software application 401 may process a selected contract template 422 to incorporate further clauses based on context-specific criteria (e.g., possibly including disclaimers, payment terms and other business terms, etc.). The contract expert system software application 401 may also determine that one or more clauses should be removed from the contract or that another clause should be substituted for one or more clauses in the contract, based on the evaluation of one or more rules. As indicated at step 408, when the contract expert system software application 401 is run, users may be required to provide responses to questions defined within one or more rules, which user-provided responses are then used by further user-defined clause selection rules, which in turn may drive further clause selections (see operation 412). The user-defined rules may include user-defined questions, or the questions may be part of the embodiment of the contract expert system software application 401. As the user provides the requested answers to the user-defined questions, rules within the selected template are applied against the provided answers, which may cause the visibility of clauses in the customized contract document to be toggled (see operation 414).

When the rules (e.g., from within the selected contract template 422 or from the embodiment of the contract expert system software application 401) have been applied, a customized instance of contract document 410 is generated. The customized instance of contract document 410 may include the pre-seeded clauses within the selected contract template 422 and may also include one or more clauses that were incorporated following evaluation of the user-defined rules and any user-defined questions contained within the user-defined rules. Likewise, the customized instance of contract document 410 may include components marked as hidden.

Figure 5:
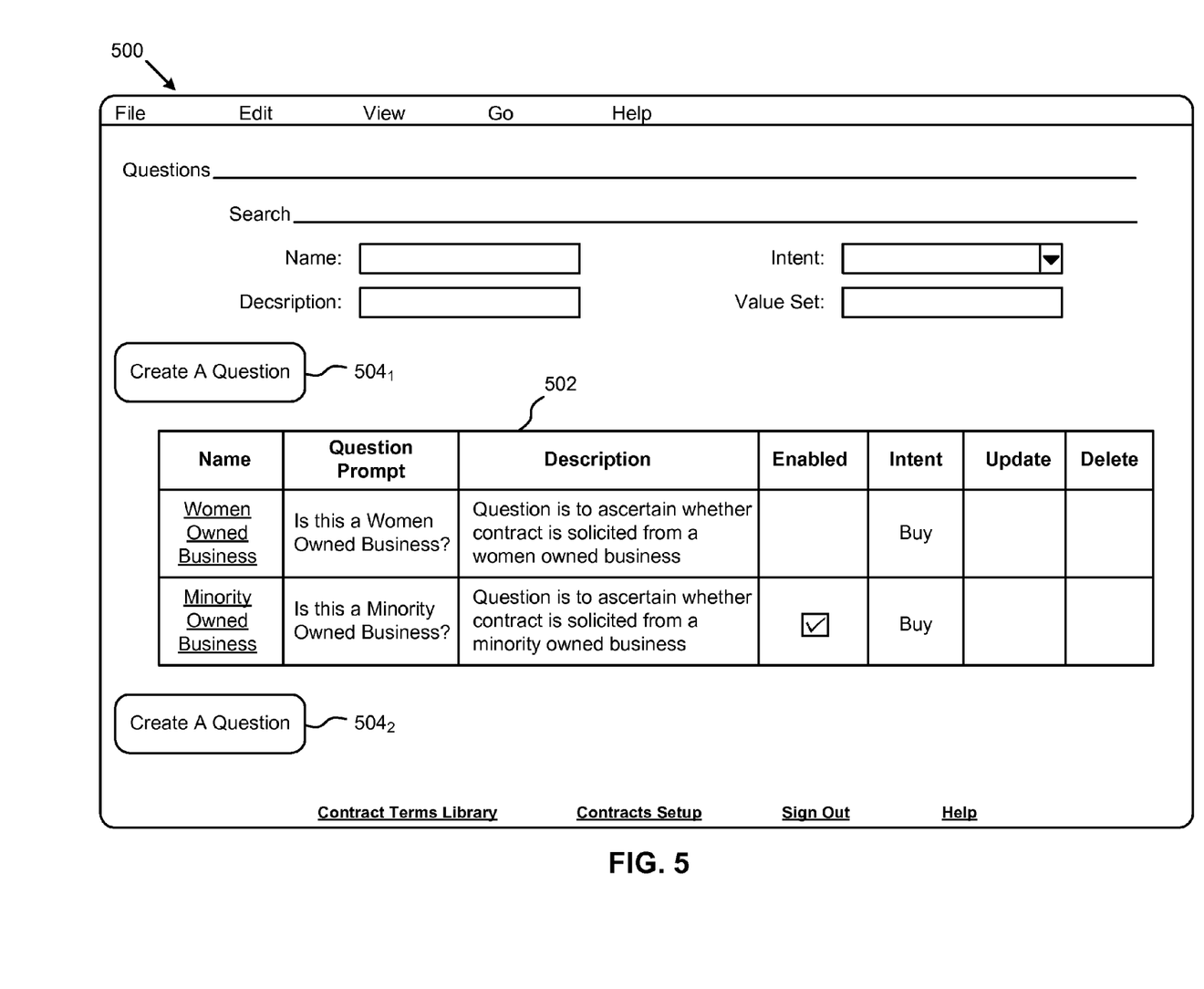
FIG. 5 is a representation of a user interface for creating a customized contract within a system for inserting rules-driven paragraphs into user-designated locations in a document after structural revisions, according to some embodiments.

FIG. 5 is a representation of a user interface 500 for creating a customized contract within a system for inserting rules-driven paragraphs into user-designated locations in a document after structural revisions. As an option, the present user interface 500 may be implemented in the context of the architecture and functionality of the embodiments described herein. Also, the user interface 500 or any aspect therein may be implemented in any desired environment.

As shown, a user interface 500 comprises a screen device (e.g., a form) for display on a computer display terminal. The form comprises question fields that can be filled in by a user (e.g., a user of contract expert system software application) as well as screen devices (e.g., button $504_1$, button $504_2$) for creating a new question. The form also comprises display summary fields 502 to aid the user in navigation through a series of expert system questions. The answer to a question can be used to form the conditional part of a rule. For example, a question variable and the user's answer to the question can be used in a rule. As earlier mentioned, XML offers one possible syntax for a rule constructed from the answer to a question as presented in a user interface 500.

<Rule1 Label="Q1",Jcode="(A1=('Yes' ? TRUE: FALSE)"/Rule1> (3)

where Q1 is a label corresponding to the question, and where A1 is a question variable to hold the answer to question Q1.

The present user interface 500 is merely one exemplary embodiment pertaining to a particular contract template, however, the specific questions within an alternative instance of user interface 500 may comprise questions related to other domains (e.g., other contract templates, or documents other than contracts), and the inclusion of this illustrative example is not intended to be limiting. Moreover the expert system descriptions here are presented to be illustrative, and the specific example disclosed is not intended to be limiting.

Additional Embodiments of the Disclosure

Figure 6:
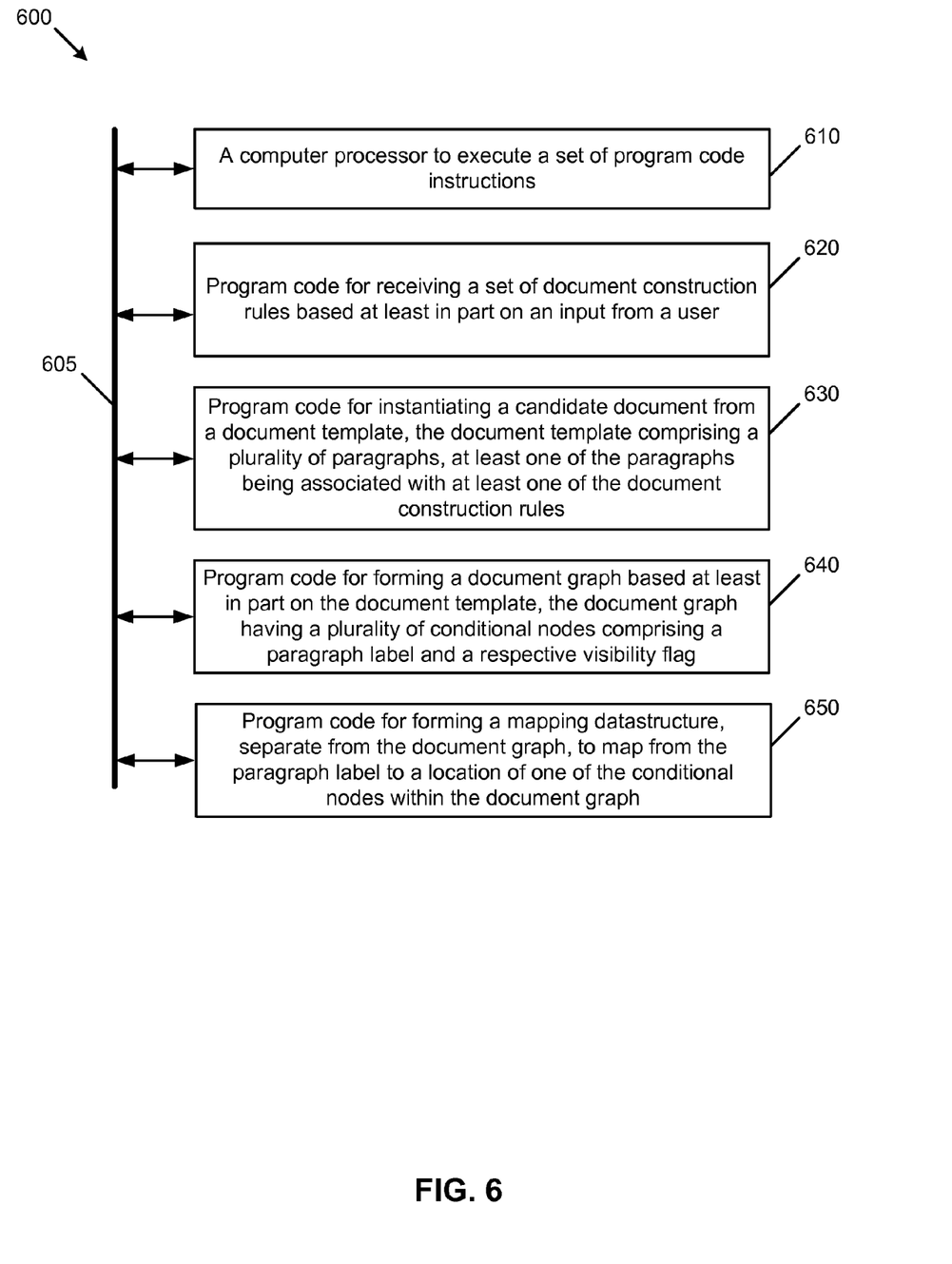
FIG. 6 is a block diagram system inserting rules-driven paragraphs into user-designated locations in a document after structural revisions, according to some embodiments.

FIG. 6 is depicts a block diagram of a system to perform certain functions of a computer system. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The embodiment of FIG. 6 implements a portion of a computer system, shown as system 600, comprising a computer processor to execute a set of program code instructions (see module 610) and modules for accessing memory to hold program code instructions to perform: receiving a set of document construction rules based at least in part on an input from a user (see module 620); instantiating a candidate document from a document template, the document template comprising a plurality of paragraphs, at least one of the paragraphs being associated with at least one of the document construction rules (see module 630); forming a document graph based at least in part on the document template, the document graph having a plurality of conditional nodes comprising a paragraph label and a respective visibility flag (see module 640); and forming a mapping datastructure, separate from the document graph, to map from the paragraph label to a location of one of the conditional nodes within the document graph (see module 650).

System Architecture Overview

Figure 7:
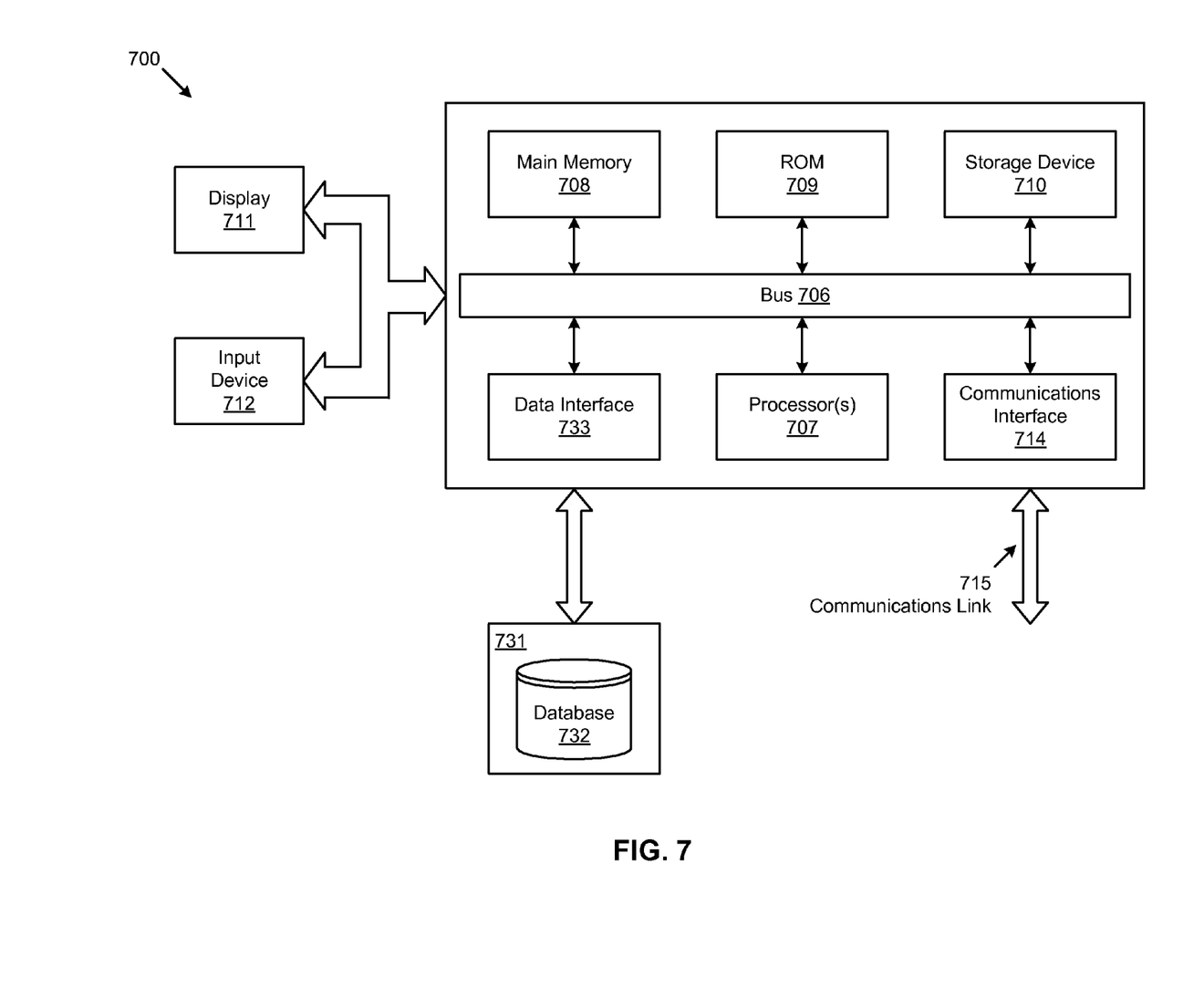
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for inserting rules-driven paragraphs into user-designated locations in a document after structural revisions, the method comprising:
   receiving a set of document construction rules;
   generating a candidate document at least by instantiating, at a computer aided module stored in computer memory, the candidate document as an instance of a document template and further by positioning a plurality of document components at respective locations in the instance of the document template prior to application of the set of document construction rules that evaluates whether one or more conditions are to be fulfilled,
      the document template comprising the plurality of document components, and
      at least one of the plurality of document components being a conditional document component associated with at least one document construction rule of the set of document construction rules;
   forming, by a computer, a document graph for the candidate document based at least in part on the document template, the document graph having a plurality of nodes that represent the plurality of document components and comprise respective document component labels and visibility flags;
   applying at least some of the set of document construction rules to the candidate document at least by traversing and annotating the document graph after the candidate document and the document graph are generated;
   forming a mapping data structure, separate from the document graph, and mapping from the respective document component labels to the respective locations of the plurality of nodes within the document graph with the mapping data structure; and
   generating a final document from the candidate document at least by rendering the conditional document component in the plurality of document components visible when a first visibility flag of the first conditional document is set to visible and rendering the conditional document component invisible when the first visibility flag of the first conditional document is set to invisible.

2. The method of claim 1, further comprising:
   evaluating a document construction rule;
   using a set of rule-to-paragraph entries to determine applicable document components; and
   using the mapping data structure to determine the location of the applicable document components within the document graph, then modifying the values of the respective visibility flags.

3. The method of claim 1 wherein the document construction rules comprises at least one of, a contract clause include-exclude parameter, a parameter determined by a contract expert system software application, a parameter determined by an interview process.

4. The method of claim 1, wherein the location is a memory pointer to the conditional node within the document graph.

5. The method of claim 1, further comprising traversing the document graph to output a document instance, the traversing comprising outputting a document component when the visibility flag is in a first state, and not outputting the document component when the visibility flag is in a second state, and the mapping data structure is a hash table and wherein the document graph is a tree structure.

6. The method of claim 1, further comprising:
identifying the first document component that corresponds to a first visibility flag having a first document component visibility flag value set to hidden;
identifying a container that includes the first document component;
identifying a container visibility flag associated with the container;
modifying the container by moving the container from a first location in the candidate document or the final document to a second location, moving the container causing the first document component to be moved despite the first document component visibility flag value is set to hidden; and
modifying the document graph based in part or in whole upon results of modifying the container.

7. The method of claim 1, further comprising:
receiving the document template as a part of an input to an interview process;
receiving user interactions from a user during the interview process including an expert system and presented to the user in a graphical user interface;
determining the document template from a template library based in part or in whole upon the user interactions during the interview;
generating the document graph at least by combining results of the user interactions during the interview process with the document template;
evaluating the set of document construction rules and determining a value of the respective visibility flag based in part or in whole upon results of the user interaction;
modifying the candidate document after the mapping data structure and the document graph have been formed;
reformatting an impacted portion of the candidate document that is affected by results of modifying the candidate document;
applying one or more applicable document construction rules in the set of document construction rules before outputting any portion of a final document for the document;
traversing the document graph to retrieve the location of one of the conditional nodes in the document graph with the mapping data structure based in part or in whole upon application of the one or more applicable document construction rules;
setting the respective visibility flag for a document component by using the location; and
outputting the final document for the document using at least the respective visibility flag, the respective document component label, and results of traversing the document graph;
identifying a first node in the document graph as a container that includes one or more contained document components;
receiving a conditional document component location indicating where the conditional document component from the user is located in the candidate document when the instance of the document template is instantiated;
specifying the conditional document component during template definition processing;
positioning the conditional document component at the conditional document component location when one or more conditional document construction rules associated with the conditional document component are evaluated to be true in applying the at least some of the set of document construction rules;
modifying one or more locations of at least some document components of the plurality of document components included in the document template without modifying the document template;
determining, at an expert system module, which document components are to be selected from the plurality of document components for the final document based in part or in whole upon one or more responses to one or more user-defined questions;
identifying, at the expert system module, one or more logical clause selection rules from a set of logical clause selection rules defined by one or more inputs from a user, the set of logical clause selection rules modeling business regulations and standards;
instantiating the instance of the document template for the candidate document with at least the one or more logical clause selection rules;
determining, at the expert system, one or more first document components to be removed from the candidate template;
determining, at the expert system, one or more second document components to be substituted by one or more third document components;
including one or more pre-seeded document components in a customized candidate document based in part or in whole on results of applying the at least some of the set of document construction rules;
identifying one or more additional document components into the plurality of document components based in part or in whole upon results of including the one or more pre-seeded document components in the customized candidate document and further upon one or more user-defined rules; and
constructing a user-defined rule at least by using a user's response held in a question variable as a conditional part of the user-defined rule.

8. A computer system for inserting rules-driven paragraphs into user-designated locations in a document after structural revisions, comprising:
a computer processor to execute a set of program code instructions; and
a memory storing thereupon the set of program code instructions, in which the set of program code instructions which, when executed by the computer processor, cause the computer processor to:
receive a set of document construction rules;
generating a candidate document at least by instantiating, at a computer aided module stored in the memory, the candidate document as an instance of a document template and further by positioning a plurality of document components at respective locations in the instance of the document template prior to application of the set of document construction rules that evaluates whether one or more conditions are to be fulfilled,
the document template comprising the a plurality of document components, and at least one of the plurality of document components being a conditional document component associated with at least one document construction rule of the set of document construction rules;

form a document graph for the candidate document based at least in part on the document template, the document graph having a plurality of nodes that represent the plurality of document components and comprise respective document component labels and visibility flags; and apply at least some of the set of document construction rules to the candidate document at least by traversing and annotating the document graph after the candidate document and the document graph are generated;

form a mapping data structure, separate from the document graph, and mapping from the respective document component labels to the respective locations of the plurality of nodes within the document graph with the mapping data structure;

generate a final document from the candidate document at least by rendering the conditional document component in the plurality of document components visible when a first visibility flag of the first conditional document is set to visible and rendering the conditional document component invisible when the first visibility flag of the first conditional document is set to invisible.

9. The computer system of claim 8, the set of program code instructions, when executed by the computer processor, further causing the computer processor to:

evaluate a document construction rule;

use a set of rule-to-paragraph entries to determine applicable document components; and use the mapping data structure to determine the location of one of the applicable document components within the document graph, then modifying values of the respective visibility flags.

10. The computer system of claim 8 wherein the set of document construction rules comprises at least one of, a contract clause include-exclude parameter, a parameter determined by a contract expert system software application, a parameter determined by an interview process.

11. The computer system of claim 8, wherein the location comprises a memory pointer to a node of the plurality of nodes within the document graph.

12. The computer system of claim 8, further comprising traversing the document graph to output a document instance, the traversing comprising outputting a document component when a corresponding visibility flag is in a first state, and not outputting the document component when the corresponding visibility flag is in a second state.

13. The computer system of claim 8, wherein the mapping data structure is a hash table and wherein the document graph is a tree structure.

14. The computer system of claim 8, the set of program code instructions, when executed by the computer processor, further causing the computer processor to modify contents of the set of documentation construction rules.

15. A computer program product embodied in a non-transitory computer readable medium, the non-transitory computer readable medium having stored thereon a sequence of instructions which, when executed by a processor, causes the processor to execute a set of acts to implement inserting rules-driven paragraphs into user-designated locations in a document after structural revisions, the set of acts comprising:

receiving a set of document construction rules;

generating a candidate document at least by instantiating, at a computer aided module stored in computer memory, the candidate document as an instance of a document template and further by positioning a plurality of document components at respective locations in the instance of the document template prior to application of the set of document construction rules that evaluates whether one or more conditions are to be fulfilled, the document template comprising the a plurality of document components, and at least one of the plurality of plurality of document components being a conditional document component associated with at least one document construction rule of the set of document construction rules;

forming a document graph for the candidate document based at least in part on the document template, the document graph having a plurality of nodes that represent the plurality of document components and comprise respective document component labels and visibility flags; and applying at least some of the set of document construction rules to the candidate document at least by traversing and annotating the document graph after the candidate document and the document graph are generated;

forming a mapping data structure, separate from the document graph, and mapping from the respective document component labels to the respective locations of the plurality of nodes within the document graph with the mapping data structure; and generating a final document from the candidate document at least by rendering the conditional document component in the plurality of document components visible when a first visibility flag of the first conditional document is set to visible and rendering the conditional document component invisible when the first visibility flag of the first conditional document is set to invisible.

16. The computer program product of claim 15, further comprising:

evaluating a document construction rule;

using a set of rule-to-paragraph entries to determine applicable document components; and using the mapping data structure to determine the location of the applicable document components within the document graph, then modifying the value of the respective visibility flag.

17. The computer program product of claim 15 wherein the set of document construction rules comprises at least one of a contract clause include-exclude parameter, a parameter determined by a contract expert system software application, or a parameter determined by an interview process.

18. The computer program product of claim 15, wherein the location comprises a memory pointer to a node of the plurality of nodes within the document graph.

19. The computer program product of claim 15, the set of acts further comprising traversing the document graph to output a document instance, the traversing comprising outputting a document component when a corresponding visibility flag is in a first state, and not outputting the document component when the corresponding visibility flag is in a second state.

20. The computer program product of claim 15, wherein the mapping data structure comprises a hash table, and wherein the document graph comprises a tree structure.

* * * * *

UNITED STATES PATENT AND TRADEMARK OFFICE
CERTIFICATE OF CORRECTION

PATENT NO. : 9,448,987 B2
APPLICATION NO. : 13/596740
DATED : September 20, 2016
INVENTOR(S) : Rajkumar Page 1 of 1

It is certified that error appears in the above-identified patent and that said Letters Patent is hereby corrected as shown below:

In the Drawings

On sheet 4 of 7, in FIG. 4, under Reference Numeral 414, Line 2, delete "evalution" and insert -- evaluation --, therefor.

On sheet 5 of 7, in FIG. 5, Line 5, delete "Decsription" and insert -- Description --, therefor.

In the Specification

In Column 11, Line 53, delete "PTSN," and insert -- PSTN, --, therefor.

In the Claims

In Column 14, Line 66, in Claim 8, delete "the a" and insert -- the --, therefor.

In Column 16, Line 11, in Claim 15, delete "the a" and insert -- the --, therefor.

In Column 16, Line 13, in Claim 15, delete "plurality of plurality of" and insert -- plurality of --, therefor.

Signed and Sealed this
Twenty-third Day of May, 2017

Michelle K. Lee
*Director of the United States Patent and Trademark Office*